(12) United States Patent
Cheng et al.

(10) Patent No.: US 12,620,044 B2
(45) Date of Patent: May 5, 2026

(54) SYSTEMS AND METHODS FOR TRACKING DISASTER FOOTPRINTS WITH SOCIAL STREAMING DATA

(71) Applicants: Lu Cheng, Tempe, AZ (US); Jundong Li, Tempe, AZ (US); Kasim Candan, Mesa, AZ (US); Huan Liu, Tempe, AZ (US)

(72) Inventors: Lu Cheng, Tempe, AZ (US); Jundong Li, Tempe, AZ (US); Kasim Candan, Mesa, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 724 days.

(21) Appl. No.: 17/544,008

(22) Filed: Dec. 7, 2021

(65) Prior Publication Data

US 2022/0180465 A1 Jun. 9, 2022

Related U.S. Application Data

(60) Provisional application No. 63/122,287, filed on Dec. 7, 2020.

(51) Int. Cl.
*G06F 17/16* (2006.01)
*G06F 40/284* (2020.01)
(Continued)

(52) U.S. Cl.
CPC ........... *G06Q 50/265* (2013.01); *G06F 17/16* (2013.01); *G06F 40/284* (2020.01); *G06Q 50/01* (2013.01)

(58) Field of Classification Search
CPC .... G06Q 50/01; G06Q 50/265; G06F 40/284; G06F 17/16
(Continued)

(56) References Cited

U.S. PATENT DOCUMENTS

| | | | | |
|---|---|---|---|---|
| 11,126,689 B1 * | 9/2021 | Warmsley | .............. | G06Q 50/01 |
| 11,373,672 B2 * | 6/2022 | Mesgarani | .............. | G10L 25/30 |

(Continued)

OTHER PUBLICATIONS

Bin Cao et al. 2007. Detect and track latent factors with online nonnegative matrix factorization. In Proceedings of the 20th international joint conference on Artifical intelligence (IJCAI'07). Morgan Kaufmann Publishers Inc., San Francisco, CA, USA, 2689-2694. (Year: 2007).*

(Continued)

*Primary Examiner* — Richemond Dorvil
*Assistant Examiner* — Rodrigo A Chavez
(74) *Attorney, Agent, or Firm* — Polsinelli PC

(57) ABSTRACT

Various embodiments for systems and methods of tracking disaster footprints using social streaming media using nonnegative matrix factorization are disclosed herein. The system extracts a summarization output from historical data and compares the summarization output with incoming data to identify differing or similar topics within the data. The summarization output is projected to adjust a time-dependency of the summarization output to enable a more direct comparison. The system additionally uses the summarization output to encode topic data within historical data to reduce computational overhead.

20 Claims, 8 Drawing Sheets

(51) Int. Cl.
   *G06Q 50/00* (2012.01)
   *G06Q 50/26* (2012.01)
(58) Field of Classification Search
   USPC ............................................................. 704/4
   See application file for complete search history.

(56) References Cited

U.S. PATENT DOCUMENTS

2013/0151525 A1* 6/2013 Ankan .................... G06F 40/30
                                         707/E17.089
2014/0188780 A1* 7/2014 Guo .................. G06F 16/24573
                                         706/52
2015/0317303 A1* 11/2015 Zhang .................... G06F 40/40
                                         707/776
2018/0232644 A1* 8/2018 Acharya ................ G06N 5/043
2020/0293902 A1* 9/2020 Li .......................... G06N 3/088
2021/0264115 A1* 8/2021 Wang ...................... G06F 16/26
2022/0164534 A1* 5/2022 Kalluri, Jr ............ G06F 40/166
2022/0180465 A1* 6/2022 Cheng .................... G06F 17/16

OTHER PUBLICATIONS

Ju-Hong Lee, Sun Park, Chan-Min Ahn, Daeho Kim, Automatic generic document summarization based on non-negative matrix factorization, Information Processing & Management, vol. 45, Issue 1, 2009, pp. 20-34, ISSN 0306-4573 (Year: 2009).*
Xiaohui Yan and Jiafeng Guo and Shenghua Liu and Xueqi Cheng and Yanfeng Wang, Learning Topics in Short Texts by Non-negative Matrix Factorization on Term Correlation Matrix, Proceedings of the 2013 SIAM International Conference on Data Mining (SDM), pp. 749-757 (Year: 2013).*
David M. Blei, Andrew Y. Ng, and Michael I. Jordan. 2003. Latent dirichlet allocation. J. Mach. Learn. Res. 3, null (Mar. 1, 2003), 993-1022. (Year: 2003).*
Cao, B.; Shen, D.; Sun, J.-T.; Wang, X.; Yang, Q.; and Chen, Z. 2007. Detect and track latent factors with online nonnegative matrix factorization. In International Joint Conference on Artificial Intelligence, vol. 7,2689-2694. IJCAI.
Chen, X., and Candan, K. S. 2014. Gi-nmf: Group incremental non-negative matrix factorization on data streams. In Proceedings of the 23rd ACM International Conference on Conference on Information and Knowledge Management, 1119-1128. ACM.
Chen, Y.; Zhang, H.; Liu, R.; Ye, Z.; and Lin, J. 2019. Experimental explorations on short text topic mining between lda and nmf based schemes. Knowledge-Based Systems 163:1-13.
Chen, X.; Candan, K. S.; and Sapino, M. L. 2018. lms-dtm: Incremental multi-scale dynamic topic models. In Proceedings of the 2018 AAAI Conference on Artificial Intelligence. AAAI.
Ding, W., and Chen, C. 2014. Dynamic topic detection and tracking: A comparison of hdp, c-word, and cocitation methods. Journal of the Association for Information Science and Technology 65(10):2084-2097.
Ding, C.; Li, T.; Peng, W.; and Park, H. 2006. Orthogonal nonnegative matrix tri-factorizations for clustering. In Proceedings of the 12th ACM SIGKDD International Conference on Knowledge Discovery and Data Mining, 126-135. ACM.
Gao, H.; Barbier, G.; and Goolsby, R. 2011. Harnessing the crowdsourcing power of social media for disaster relief. IEEE Intelligent Systems 26(3):10-14.
Hoffman, M.; Bach, F. R.; and Blei, D. M. 2010. Online learning for latent dirichlet allocation. In Advances in Neural Information Processing systems, 856-864. NIPS.
Houston, J. B.; Hawthorne, J.; Perreault, M. F.; Park, E. H.; Hode, M. G.; Halliwell, M. R.; Mcgowen, S. T.; Davis, R.; Vaid, S.;

Mcelderry, J. A.; et al. 2014. Social media and disasters: a functional framework for social media use in disaster planning, response, and research. Disasters 39(1):1-22.
Kalyanam, J.; Mantrach, A.; Saez-Trumper, D.; Vahabi, H.; and Lanckriet, G. 2015. Leveraging social context for modeling topic evolution. In Proceedings of the 21th ACM SIGKDD International Conference on Knowledge Discovery and Data Mining, 517-526. ACM.
Kim, H.; Choo, J.; Kim, J.; Reddy, C. K.; and Park, H. 2015. Simultaneous discovery of common and discriminative topics via joint nonnegative matrix factorization. In Proceedings of the 21th ACM SIGKDD International Conference on Knowledge Discovery and Data Mining, 567-576. ACM.
Kumar, S.; Barbier, G.; Abbasi, M. A.; and Liu, H. 2011. Tweettracker: An analysis tool for humanitarian and disaster relief. In Proceedings of the 2011 AAAI Conference on Web and Social Media. AAAI.
Lee, D. D., and Seung, H. S. 2000. Algorithms for non-negative matrix factorization. In Advances in Neural Information Processing systems, 556-562. NIPS.
Lehmann, J.; Gonc~alves, B.; Ramasco, J. J.; and Cattuto, C. 2012. Dynamical classes of collective attention in twitter. In Proceedings of the 21st International Conference on World Wide Web, 251-260. ACM.
Leskovec, J.; Backstrom, L.; and Kleinberg, J. 2009. Meme-tracking and the dynamics of the news cycle. In Proceedings of the 15th ACM SIGKDD International Conference on Knowledge Discovery and Data Mining, 497-506. ACM.
Mathioudakis, M., and Koudas, N. 2010. Twittermonitor: trend detection over the twitter stream. In Proceedings of the 2010 ACM SIGMOD International Conference on Management of Data, 1155-1158. ACM.
Meier, P. 2015. Digital humanitarians: how big data is changing the face of humanitarian response. Routledge.
Nazer, T. H.; Xue, G.; Ji, Y.; and Liu, H. 2017. Intelligent disaster response via social media analysis a survey. ACM SIGKDD Explorations Newsletter 19(1):46-59.
Niculae, V.; Suen, C.; Zhang, J.; Danescu-Niculescu-Mizil, C.; and Leskovec, J. 2015. Quotus: The structure of political media coverage as revealed by quoting patterns. In Proceedings of the 24th International Conference on World Wide Web, 798-808. International World Wide Web Conferences Steering Committee.
Saha, A., and Sindhwani, V. 2012. Learning evolving and emerging topics in social media: a dynamic nmf approach with temporal regularization. In Proceedings of the 5th ACM International Conference on Web Search and Data Mining, 693-702. ACM.
Shi, T.; Kang, K.; Choo, J.; and Reddy, C. K. 2018. Short-text topic modeling via non-negative matrix factorization enriched with local word-context correlations. In Proceedings of the 2018 World Wide Web Conference, 1105-1114. Inter national World Wide Web Conferences Steering Committee.
Tu, D.; Chen, L.; Lv, M.; Shi, H.; and Chen, G. 2018. Hierarchical online nmf for detecting and tracking topic hierarchies in a text stream. Pattern Recognition 76:203-214.
Vaca, C. K.; Mantrach, A.; Jaimes, A.; and Saerens, M. 2014. A time-based collective factorization for topic discovery and monitoring in news. In Proceedings of the 23rd International Conference on World Wide Web, 527-538. ACM.
Wang, Y.; Agichtein, E.; and Benzi, M. 2012. Tm-lda: efficient online modeling of latent topic transitions in social media. In Proceedings of the 18th ACM SIGKDD International Conference on Knowledge Discovery and Data Mining, 123-131. ACM.
Wang, F.; Tan, C.; Li, P.; and Kownig, A. C. 2011. Efficient document clustering via online nonnegative matrix factorizations. In Proceedings of the 2011 SIAM International Conference on Data Mining, 908-919. SIAM.
Zhao, R.; Tan, V. Y.; and Xu, H. 2016. Online nonnegative matrix factorization with general divergences. arXiv preprint arXiv:1608.00075.

* cited by examiner

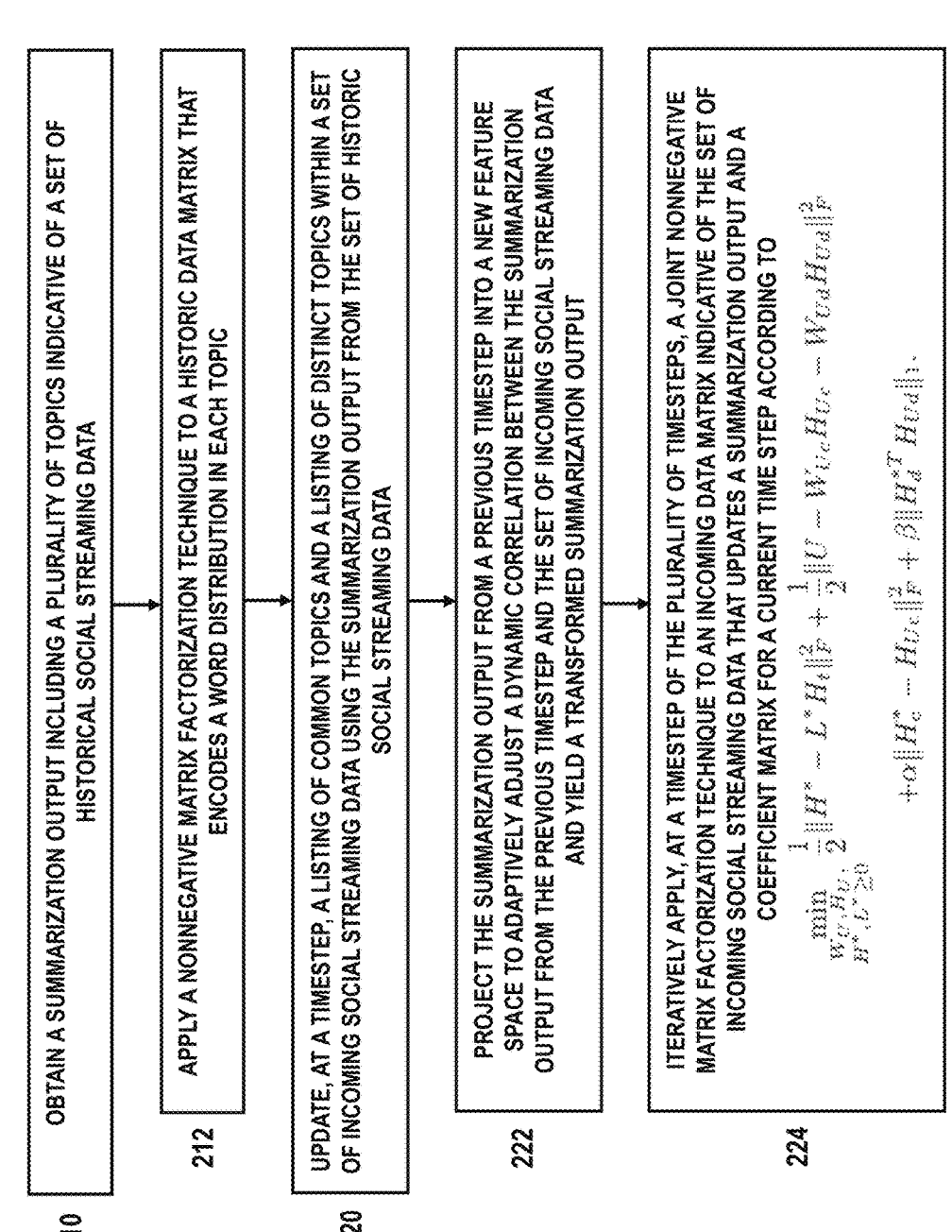

200

210 — OBTAIN A SUMMARIZATION OUTPUT INCLUDING A PLURALITY OF TOPICS INDICATIVE OF A SET OF HISTORICAL SOCIAL STREAMING DATA

212 — APPLY A NONNEGATIVE MATRIX FACTORIZATION TECHNIQUE TO A HISTORIC DATA MATRIX THAT ENCODES A WORD DISTRIBUTION IN EACH TOPIC

220 — UPDATE, AT A TIMESTEP, A LISTING OF COMMON TOPICS AND A LISTING OF DISTINCT TOPICS WITHIN A SET OF INCOMING SOCIAL STREAMING DATA USING THE SUMMARIZATION OUTPUT FROM THE SET OF HISTORIC SOCIAL STREAMING DATA

222 — PROJECT THE SUMMARIZATION OUTPUT FROM A PREVIOUS TIMESTEP INTO A NEW FEATURE SPACE TO ADAPTIVELY ADJUST A DYNAMIC CORRELATION BETWEEN THE SUMMARIZATION OUTPUT FROM THE PREVIOUS TIMESTEP AND THE SET OF INCOMING SOCIAL STREAMING DATA AND YIELD A TRANSFORMED SUMMARIZATION OUTPUT

224 — ITERATIVELY APPLY, AT A TIMESTEP OF THE PLURALITY OF TIMESTEPS, A JOINT NONNEGATIVE MATRIX FACTORIZATION TECHNIQUE TO AN INCOMING DATA MATRIX INDICATIVE OF THE SET OF INCOMING SOCIAL STREAMING DATA THAT UPDATES A SUMMARIZATION OUTPUT AND A COEFFICIENT MATRIX FOR A CURRENT TIME STEP ACCORDING TO $$\min_{\substack{W_{FC},H_{V_C} \\ E^\ast,L^\ast \geq 0}} \frac{1}{2}\|H^\ast - L^\ast H_{v_c}\|_F^2 + \frac{1}{2}\|U - W_{vc}H_{v_c} - W_{vd}H_{vd}\|_F^2$$
$$+ \alpha\|H_c^\ast - H_{vc}\|_F^2 + \beta\|H_d^{\ast T} H_{vd}\|_1.$$

FIG. 3

SYSTEMS AND METHODS FOR TRACKING DISASTER FOOTPRINTS WITH SOCIAL STREAMING DATA

CROSS-REFERENCE TO RELATED APPLICATIONS

This is a non-provisional application that claims benefit to U.S. Provisional Patent Application Ser. No. 63/122,287 filed 7 Dec. 2020, which is herein incorporated by reference in its entirety.

GOVERNMENT SUPPORT

This invention was made with government support under grants 1610282 and 1909555 awarded by the National Science Foundation. The government has certain rights in the invention.

FIELD

The present disclosure generally relates to tracking disaster footprints; and in particular, systems and methods for tracking disaster footprints using social streaming media.

BACKGROUND

Social media reveals dynamic changes of discussions with topics evolving over time. Take the Asia tsunami disaster as an example, major topics of the reports evolved from "financial aids" to "debt" and "reconstruct" over different stages. Online topic tracking can benefit disaster responders in the following ways: (1) For emergency managers and people affected by the natural calamities, it is often of particular interest to identify topics that prevail over time, i.e., common topics, such as "disaster rescue", as well as to be alerted to any new emerging themes of disaster-related discussions that are fast gathering in social media streams, i.e., distinct topics such as "the latest tsunami destruction". (2) For global participants, a quick update of the disaster status-quo, i.e., the commonness and distinctiveness between previous and current topics, is necessary for them to provide immediate and effective assistance. A major obstacle to disaster-related topic tracking, however, is that social media generates massive amount of data each day and it is notorious for a sea of unwanted and noisy content such as spam and daily chatter. For example, during Hurricane Harvey, Twitter reported there have been 21.2 million hurricane-related tweets within the first six days and a large portion was generated in a short period of time to spread rumors. Consequently, a new way of effective online topics discoveries using social media data during disaster response is urgent.

It is with these observations in mind, among others, that various aspects of the present disclosure were conceived and developed.

BRIEF DESCRIPTION OF THE DRAWINGS

FIG. 3 is a proves flow showing a process for tracking topics from incoming social streaming data according to the system of FIG. 2;

Corresponding reference characters indicate corresponding elements among the view of the drawings. The headings used in the figures do not limit the scope of the claims.

DETAILED DESCRIPTION

Social media has become an indispensable tool in the face of natural disasters due to its broad appeal and ability to quickly disseminate information. For instance, Twitter is an important source for disaster responders to search for (1) topics that have been identified as being of particular interest over time, i.e., common topics such as "disaster rescue"; (2) new emerging themes of disaster-related discussions that are fast gathering in social media streams, i.e., distinct topics such as "the latest tsunami destruction". To understand the status quo and allocate limited resources to most urgent areas, emergency managers need to quickly sift through relevant topics generated over time and investigate their commonness and distinctiveness. A major obstacle to the effective usage of social media, however, is its massive amount of noisy and undesired data. Hence, a naive method, such as set intersection/difference to find common/distinct topics, is often not practical. To address this challenge, the present disclosure discusses a new topic tracking problem that seeks to effectively identify the common and distinct topics with social streaming data. The problem is important as it presents a promising new way to efficiently search for accurate information during emergency response. This is achieved by an online Nonnegative Matrix Factorization (NMF) technique that conducts a faster update of latent factors, and a joint NMF technique that seeks the balance between the reconstruction error of topic identification and the losses induced by discovering common and distinct topics. Extensive experimental results on real-world datasets collected during Hurricane Harvey and Florence reveal the effectiveness of the framework.

Figure 1:
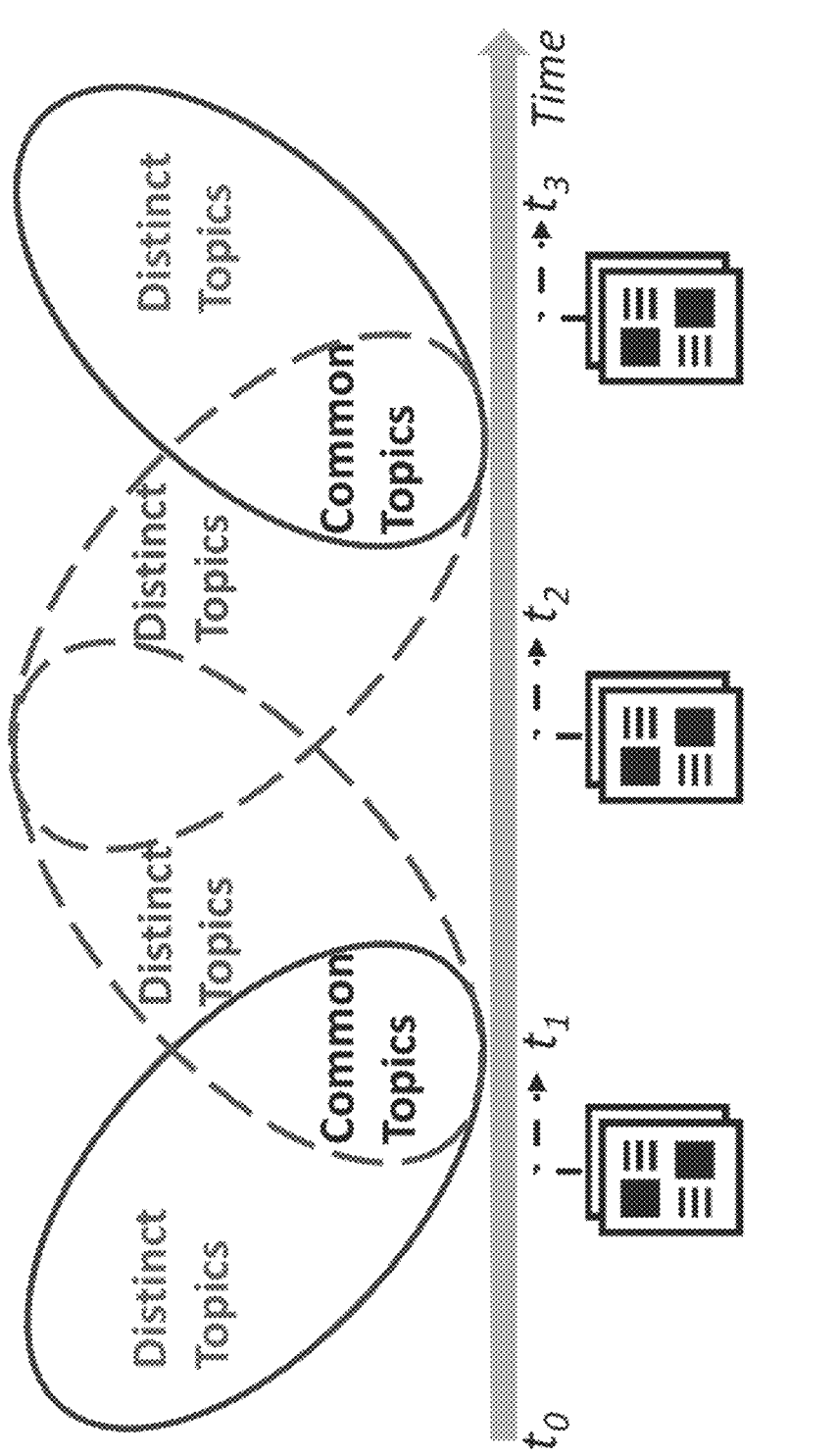
FIG. 1 is a simplified illustration showing the studied problem.

A novel topic tracking problem that seeks to identify common and distinct topics using social streaming data related to disasters is disclosed herein. Discovering the commonness and differences between topics in an online fashion provides an effective and efficient way for information seekers to search for both prevailing and emerging topics. For instance, emergency managers can make informed decisions about how to effectively allocate funds and other resources to areas that need most assistance by comparing the commonness and distinctiveness of topics generated from these areas over time. The problem is illustrated in FIG. 1. The goal is to discover topics from the historical and incoming data and identify their commonness and distinctiveness.

However, the problem presents several challenges. In particular, acquiring insights via social media needs to process enormous amounts of noisy data in a timely fashion. There were 1,200 tweets posted per minute from Tokyo after Japan earthquake and tsunami (2011) and 16,000 tweets per minute at the peak of Hurricane Sandy (2012). Consequently, models for online topic tracking should be computation-efficient and storage-saving. The other challenge requires discovering common and distinct topics along time entails the model to simultaneously compute the commonness and differences of topics extracted from the historical and incoming data in an online fashion. This second challenge is, therefore, how to efficiently identify meaningful topics from social streaming data meanwhile jointly model the commonalities and differences between these topics.

To address these issues, the present disclosure discusses an online topic tracking approach—Tracking Disaster Footprints (TDF) with social streaming data. TDF consists of two major components: An online Nonnegative Matrix Factorization (NMF) scheme that conducts fast update of latent factors and a joint NMF technique that seeks the balance between the reconstruction error of topic identification and the losses induced by discovering common and distinct topics. Existing work on online topic tracking; however, cannot fully satisfy the needs as they do not explicitly model the relationships between discovered topics over time. TDF is based on NMF because it often works very well out of box for corpora of short texts such as tweets and the NMF-based models have shown outstanding performance in dimension reduction and clustering for the high-dimensional data. The main contributions of present inventive concept are:

Problem: A problem of online common/distinct topic tracking with social streaming data for disaster relief is discussed herein. The core difference between the proposed problem and standard online topic modeling is that the present disclosure takes a step further to investigate the commonness and distinctiveness between these topics generated over time.

Algorithm: A new online topic tracking framework TDF that contains an online NMF and a joint NMF components is also disclosed herein. The algorithm seeks to efficiently solve NMF and simultaneously discover the common and distinct topics in an online manner.

Data: Two real-world datasets were collected during Hurricane Harvey (2017) and Hurricane Florence (2018) using keywords and geo-location specific methods, respectively. Datasets and select pieces of custom code are available upon request.

Evaluation: TDF was evaluated on these two datasets and perform in-depth qualitative and quantitative studies. Experimental results reveal that the present inventive concept is effective and hence, has practical usage in real-world applications.

Framework

A brief review of the standard NMF model and a popular online NMF model is disclosed. The core components of TDF are then discussed in greater detail. Specifically, TDF first employs this online NMF algorithm to obtain the latent factors from matrix factorization. These latent factors that encode the discovered topics from historical data, together with the newly arriving data, are then fed into a joint NMF framework to identify the common and distinct topics for disaster relief.

Preliminaries

Conventional NMF. NMF seeks to decompose a non-negative matrix into two low-rank non-negative matrices. Let the document-word matrix $$V \in \mathbb{R}_+^{n \times d}$$

contain n documents. Each document is represented by a d-dimension feature vector. NMF is then formalized as:

$$V \approx WH, \tag{1}$$

where $$W \in \mathbb{R}_+^{n \times k}$$

is a coefficient matrix such that each row encodes the document as a weighted combination of k topics, and $$H \in \mathbb{R}_+^{k \times d}$$

is a basis matrix indicating a summarization of latent factors, where each row denotes the word distribution in each topic of a plurality of topics present within the document. The NMF problem is solved by the following optimization problem:

$$\min_{W, H \geq 0} \frac{1}{2} \|V - WH\|_F^2. \tag{2}$$

Online NMF (ONMF). A naïve solution to find topics from streaming data is to apply NMF repeatedly on the incoming data batch and perform aggregation later. While this method could save computational cost, it overlooks the time dependencies between the decomposed latent factors. Instead, the framework leverages the information from previously learned latent factor (summarization output) H and combines it with the new batch of data that arrives at the current time stamp. The framework applies the NMF to this new data matrix.

Suppose that $$V_t \in \mathbb{R}_+^{n_t \times d}$$

records the historical social streaming data received from the starting time till time t. Then the objective function of NMF at t is defined as:

$$\min_{W_t, H_t \geq 0} \frac{1}{2} \|V_t - W_t H_t\|_F^2. \tag{3}$$

Consider a new batch of incoming social streaming data $$U \in \mathbb{R}_+^{p \times d}$$

arrives at time t+1. Then the factorization at t+1 will be:

$$V_{t+1} = \begin{pmatrix} V_t \\ U \end{pmatrix} \approx W_{t+1} H_{t+1}. \quad (4)$$

The goal of online NMF (ONMF) is to efficiently update $W_{t+1}$, $H_{t+1}$ without storing $V_t$ and conducting matrix factorization from scratch.

To speed up the computation, the data matrix $V_t$ was replaced with the learned latent factor $H_t$ obtained from Eq. (3):

$$\begin{pmatrix} H_t \\ U \end{pmatrix} \approx \begin{pmatrix} W_t^* \\ W_U \end{pmatrix} H_{t+1}, \quad (5)$$

where $$W_t^*$$

is a k×k non-negative matrix that captures the correlation between $H_t$ and $H_{t+1}$.

$$W_U \in \mathbb{R}_+^{p \times k}$$

is the discovered topics associated with U. From Eq. (5), the following is produced $$H_t \approx W_t^* H_{t+1}$$

and $U \approx W_U H_{t+1}$. Plugging it in $V_t \approx W_t H_t$ at time t, the following is produced:

$$V_t \approx W_t W_t^* H_{t+1}. \quad (6)$$

Thus, the factorization can be reformulated in Eq. (4) with the equation below:

$$V_{t+1} \approx \begin{pmatrix} W_t W_t^* \\ W_U \end{pmatrix} H_{t+1} = W_{t+1} H_{t+1}. \quad (7)$$

According to the Full-Rank Decomposition Theorem, the update rules for $W_{t+1}$, $H_{t+1}$ can then be summarized as $$W_{t+1} = \begin{pmatrix} W_t W_t^* \\ W_U \end{pmatrix}, H_{t+1} = W_t^{*-1} H_t. \quad (8)$$

Tracking the Topic Evolution

Previous section presents a simple approach that can efficiently update the document-topic and topic-word latent factors in NMF. Nevertheless, this approach will not efficiently seek common topics, i.e., topics that appear both before t and at t+1, along with distinct topics, i.e., two sets of topics that are unique to data generated before t and that at t+1, respectively. Here, we take a step further and provide an in-depth investigation of the relationships between the discovered topics. The present framework is built upon earlier concepts which attempt to discover common and discriminative topics from two static text corpora. However, as the focus was on tracking topics with disaster-related social streaming data, conventional methods proposed earlier cannot be directly applied to our problem due to its high computational cost and storage demand.

Figure 2:
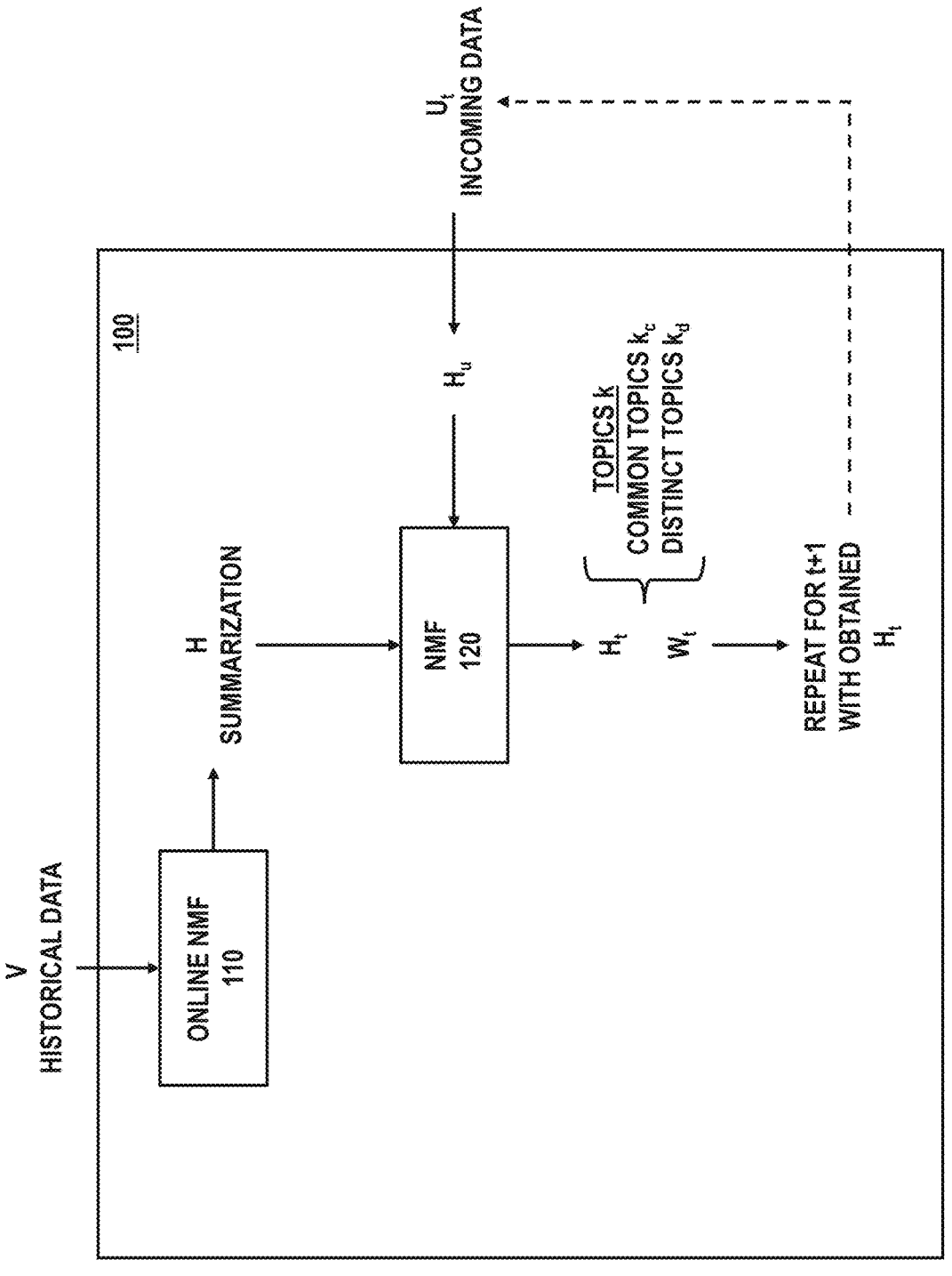
FIG. 2 is a simplified diagram showing a system for tracking topics from incoming social streaming data.
Figures 4A, 4B, 4C:
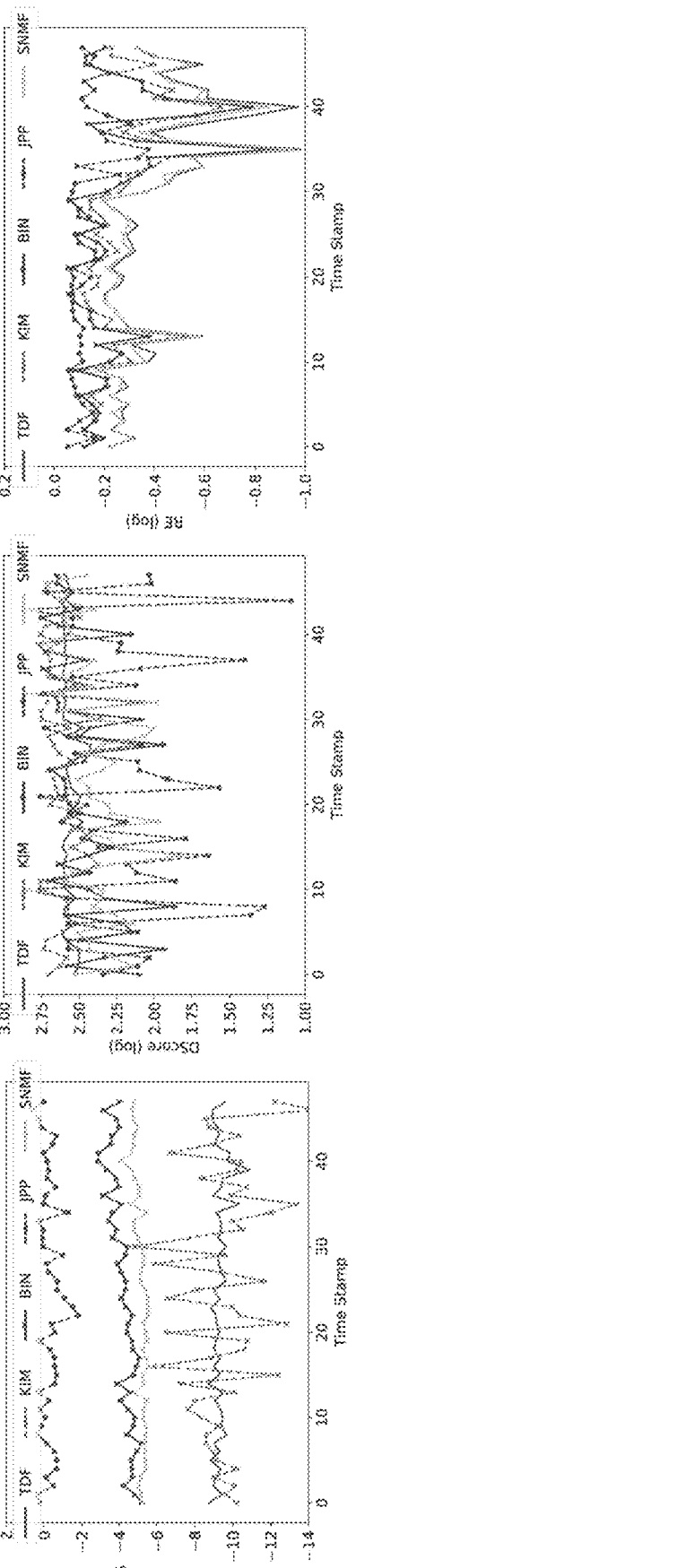
FIGS. 4A-4C are graphical representations showing performance comparisons of different methods of using a Harvey dataset.
Figures 5A, 5B, 5C:
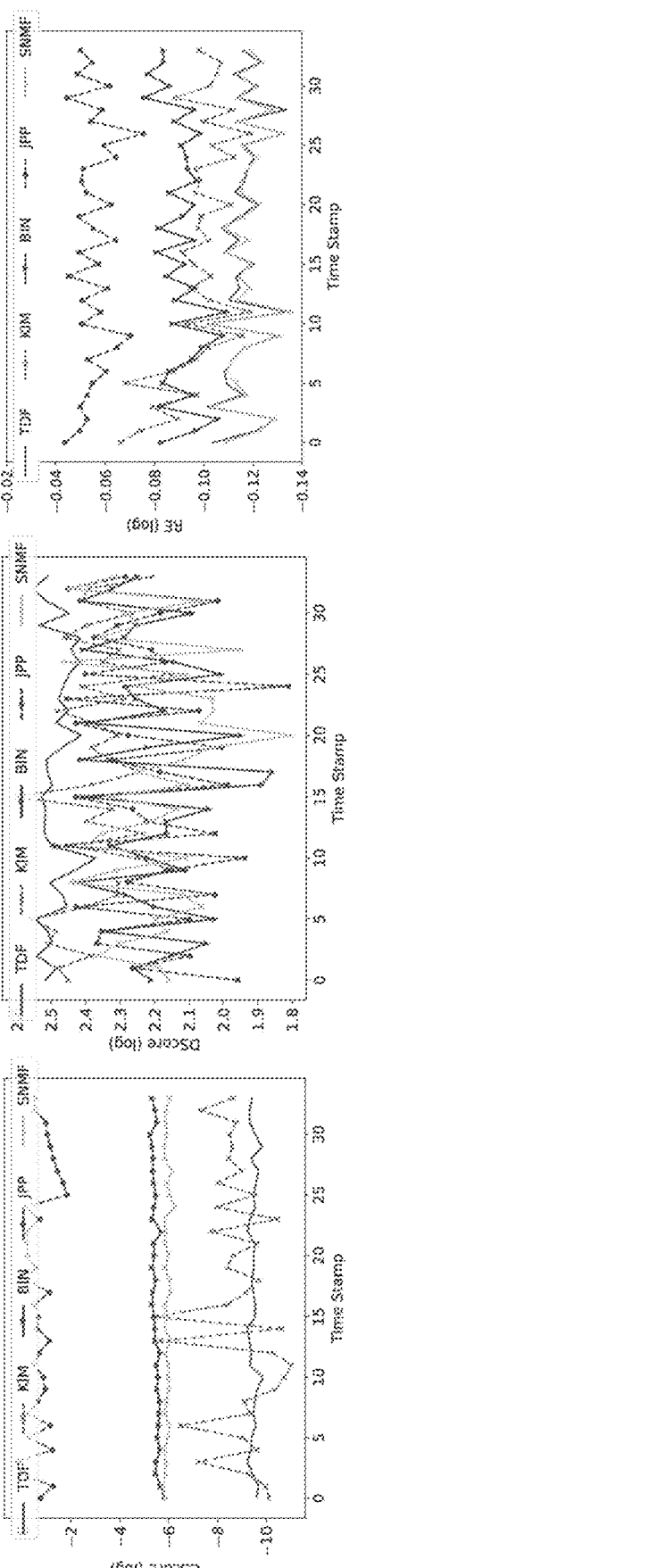
FIGS. 5A-5C are graphical representations showing performance comparisons of different methods of using a Florence dataset.

Suppose that there are k hidden topics in the documents, denoted as k, the number of common topics we aim to identify, and as $k_d(=k-k_c)$ the number of distinct topics that are of particular interest. One may observe that a large memory storage and computational cost are in need to obtain the decomposed factors when $V_t$ (the historical accumulated documents) becomes larger. Referring to FIGS. 2 and 3, to address this issue, the system 100 leverages the output $H_t$ from an ONMF module 110 which gives a succinct topic summarization of the information embedded in $V_t$ from previous timesteps. Together with the incoming data U, the system 100 aims to discover the common and distinct topics between $V_t$ and U.

Nevertheless, $H_t$ that is incrementally updated by the ONMF module 110 cannot be directly applied to find the common and distinct topics as it has been fixed at the new time stamp t+1. Therefore, the system 100 applies a linear transformation on $H_t$ to obtain a transformed summarization output, i.e., $H^* \approx L^* H_t$ so that in the new transformed feature space, common and distinct topics can be found along with U (in particular the factorized incoming topic matrix $H_u$ from U). Here, $$L^* \in \mathbb{R}_+^{k \times k}$$

is the transformation matrix and is used to dynamically adjusts the dependency between $H_t$ and U. Specifically, the system 100 lets the first $k_c$ topics in $H^*$ and $H_U$ be the common topics and the rest $k_d$ be the distinct topics. To this end, the system 100 includes an NMF module 120 that looks for a joint NMF model that seeks to: 1) transform $H_t$ to a new feature space $H^*$; 2) minimize the reconstruction error of NMF on U, i.e., $U \approx W_U H_U$; 3) minimize the distances between $k_c$ topic representations in $H^*$ and $H_U$; 4) maximize the distances (minimize similarity) between $k_d$ topic representations in the $H^*$ and $H_U$.

Consequently, the objective function of the joint NMF at t+1 is defined as follows:

$$\min_{\substack{W_U, H_U, \\ H^*, L^* > 0}} \frac{1}{2} \|H^* - L^* H_t\|_F^2 + \quad (9)$$

$$\frac{1}{2} \|U - W_{Uc} H_{Uc} - W_{Ud} H_{Ud}\|_F^2 + \alpha f_c(H_c^*, H_{Uc}) + \beta f_d(H_d^*, H_{Ud}).$$

Where $H_{Uc}$, $$H_c^*$$

are the first $k_c$ rows in $H_U$ and $H^*$ respectively, and $H_{Ud}$, $$H_d^*$$

are the rest $k_d$ rows, i.e., $$H_U = \begin{pmatrix} H_{Uc} \\ H_{Ud} \end{pmatrix}, H^* = \begin{pmatrix} H_c^* \\ H_d^* \end{pmatrix}.$$

In addition, $W_U = [W_{Uc}, W_{Ud}]$, $f_c$ and $f_d$ are the measures of commonness and distinctiveness between topics.

For the first term in the above formulation, the system 100 linearly projects $H_t$ into the new feature space by minimizing the squared Frobenius norm between $H^*$ and $L^*H_t$. The transformation enables TDF to compare the commonness between topics that are more similar and the distinctiveness between topics that are more likely to be different between $V_t$ and U. The second term enables the system 100 to perform NMF on U where the first $k_c$ topics are the common topics and the rest $k_d$ topics are the distinct ones. The second term can also be interpreted as minimizing a reconstruction error on the set of incoming social streaming data by minimizing a difference between the incoming data matrix U and a reconstructed common topic matrix ($W_{Uc}H_{Uc}$) and a reconstructed distinct topic matrix ($W_{Ud}H_{Ud}$). The second term is responsible for updating the coefficient matrix $W_U$.

The third term enables the system 100 to minimize the distance between $H_c^*$ and $H_{Uc}$, a smaller distance is desired. In particular, it is defined as $$f_c(H_c^*, H_{Uc}) = \|H_c^* = H_{Uc}\|_F^2. \tag{10}$$

The last term in Eq. (9) enables the system 100 to minimize the similarity between $$H_d^*$$

and $H_{Ud}$, a smaller value is desired.

$$H_d^*$$

and $H_{Ud}$, are each respectively indicative of a plurality of common topics in the transformed summarization output and the factorized incoming topic matrix. Similarity in this context is defined as:

$$f_d(H_d^*, H_{Ud}) = \|H_d^{*T} H_{Ud}\|_1. \tag{11}$$

The parameters $\alpha$ and $\beta$ are used to control the balance between the NMF reconstruction error and the losses induced by discovering the common and distinct topics. By plugging the two terms in Eq. (10) and Eq. (11) into Eq. (9), the final objective function is then:

$$\min_{W_U, H_U,} \frac{1}{2} \|H^* - L^* H_t\|_F^2 + \tag{12}$$
$$H^*, L^* > 0$$

-continued $$\frac{1}{2} \|U - W_{Uc}H_{Uc} - W_{Ud}H_{Ud}\|_F^2 + \alpha \|H_c^* - H_{Uc}\|_F^n + \beta \|H_d^T H_{Ud}\|_1.$$

This disclosure highlights the following contributions: Previous techniques take two static documents as the input. Therefore, to conduct NMF at time t+1, they must store all historical data $V_t$ and compute $W_{t+1}$ and $H_{t+1}$ from scratch at each time step. This is extremely inefficient and storage expensive. Instead, the present system 100 leverages ONMF and uses the summarization output $H_t$ as a high-level succinct summarization of discovered topics in $V_t$. As such, TDF can handle large-scale data streams and efficiently update the latent factors when new data comes in. Further, the system 100 projects the learnt $H_t$ into a new feature space to adaptively adjust the dynamic correlation between $H_t$ and U. This enables the system 100 to identify the common and distinct topics between two sets of documents consecutively generated over time.

Referring to FIG. 3, a process flow 200 is illustrated that describes the above process of system 100. At block 210, the system 100 obtains a summarization output H including a plurality of topics indicative of a set of historical social streaming data. This step includes sub-block 212 at which the system applies an online NMF technique to a historic data matrix V that encodes a word distribution in each topic. At block 220, the system 100 updates, at a timestep, a listing of common topics and a listing of distinct topics within a set of incoming social streaming data using the summarization output H from the set of historic social streaming data. Block 220 includes sub-block 222 at which the system 100 projects the summarization output H from a previous timestep into a new feature space to adaptively adjust a dynamic correlation between the summarization output H from the previous timestep and the set of incoming social streaming data and yield a transformed summarization output H*. At sub-block 224 of block 220, the system 100 iteratively applies a joint NMF technique to an incoming data matrix U indicative of the set of incoming social streaming data that updates a summarization output H and a coefficient matrix W for a current time step according to Eq. 12.

The pseudo code for TDF of the present system 100 is illustrated in Algorithm 1. For optimization, the framework adopts the widely used multiplicative update rules alternatively update the variables until the objective converges.

| Algorithm 1 The TDF framework. |
| --- |
| Input: The data matrix $V \in \mathbb{R}_+^{n \times d}$ at the starting time $t = 1$, the incoming data matrix $U_t$, t ∈ 2, . . ., T, the number of topics k, the number of common/distinct topics $k_c/k_d = k - k_c$, parameters $\alpha$, $\beta$. |
| Output: The common and different topics between t − 1 and t, t ∈ {2, . . ., T}. |
| 1: Initialize $W_1$, $H_1$; |
| 2: while not converge do |
| 3:   Update $W_1$, $H_1$; |
| 4: end while |
| 5: for t = 2,3, . . ., T do |
| 6:   Solve Eq. (12) with the input $U_t$ and $H_{t-1}$; |
| 7:   Update $W_t$, $H_t$ with Eq. (8). |
| 8: end for |

Experimental Evaluations

In this section, various qualitative and quantitative analyses were conducted to evaluate the performance of TDF for finding common and distinct topics during disaster response. In particular, TDF was first compared with the standard NMF model, existing online topic modeling approaches, and a model that simultaneously discovers common and distinct topics. In-depth case studies are provided for permitting a better understanding of the specific usage of the TDF framework. To examine the robustness of the framework, sensitivity analyses on model parameters $\alpha$, $\beta$, and $k_c$ (or $k_d$) were conducted. In particular, the aim was to answer the following research questions: (1) How effective is TDF for online topic modeling, especially for the detection of common and distinct topics over time after disasters? (2) How competitive is the computational speed of the framework compared to other baseline models? (3) How do the changes of model parameters affect the performance of TDF?

Datasets

The system 100 crawled real-world datasets related to two recent natural disasters—Hurricane Harvey (2017) and Hurricane Florence (2018) from Twitter1 using the TweetTracker system2. TweetTracker is an analysis tool for humanitarian and disaster relief, and is capable of monitoring and analyzing location or keyword specific tweets with near real-time trending. The mostly used hashtags/words were selected during Hurricane Harvey to extract related tweets for the Harvey dataset: #harvey, #hurricaneharvey, #HurricaneHarveyRelief, #texas, #houston, #help, #hurricane, #relief, #houstonflood, hurricane, harvey. The percentage of geo-tagged tweets in this dataset is 5.5%. The second dataset Florence was collected during Hurricane Florence in September 2018. Different from the above keyword-specific method, the framework crawled all geo-tagged tweets that were posted where the disaster occurred. Each tweet in this dataset is associated with a geo-location (longitude and latitude). Table 1 summarizes the basic statistics of these two datasets. Data and select pieces of custom code are available upon request.

TABLE 1

Basic statistics of the datasets

| Datasets | Methods | # Tweets | Start Date | End Date |
|---|---|---|---|---|
| Harvey | Keywords | 171,436 | Aug. 25, 2017 | Sep. 10, 2017 |
| Florence | Location | 78,753 | Sep. 12, 2018 | Oct. 10, 2018 |

Experimental Setup

TF-IDF values were obtained from tweets as the input features. Entries with large TF-IDF values are the terms that occur often in particular tweets and very rarely anywhere else, i.e., important terms. For both datasets, experiments began with 10,000 tweets and assumed a batch size of 2,000 new tweets arriving at every time stamp. Values of k and $k_c$ are set to 10 and 7 respectively, $k_d$=k-$k_c$=3.

TDF was compared with the following baseline models.
Standard NMF (SNMF): This is the basic NMF method which re-calculates the latent factors using the entire dataset each time when a new batch of data arrives. The topics extracted from the historical data were compared with the newly arriving data.
KIM (Kim et al. 2015): This approach seeks to discover common and discriminative topics simultaneously given two document sets. Similarly, the framework takes the historical data and the newly arriving data as two input documents.
BIN (Cao et al. 2007): This work proposed an orthogonalized online NMF. It conducts an orthogonality constraint to guarantee the unique solution (Cao et al. 2007). Its incremental nature enables the framework to find the topics from the historical data and the newly arriving data.
JPP (Vaca et al. 2014): This is a time-based collective factorization method for online topic discovery. It connects topics between different time slots via a k×k matrix, where k is the number of topics.

The framework uses reconstruction error, commonness score, and distinctiveness score to measure the performance of different methods. As all baselines are based on NMF, it is fair to make comparisons with these measures.

Reconstruction Error. The reconstruction error (RE) measures the loss of the NMF on the newly arriving data U at each time stamp. Models with smaller RE can better reconstruct the data matrix U.

Commonness Score (CScore). The CScore denotes the similarity between the $k_c$ common topics at time t and t+1:

$$CScore = \frac{1}{k_c}\|H_c^* - H_{Uc}\|_F^2. \tag{13}$$

A small CScore indicates a better quality for this measure.

Difference Score (DScore). The present framework uses the averaged symmetric Kullback-Leibler divergence between all the distinct topic pairs as the DScore:

$$DScore = \frac{1}{2k_d^2}\sum_{i-1}^{k_d}\sum_{j=1}^{k_d} \tag{14}$$

$$\left[H_d^{*(i)}\log\left(h_d^{*(i)}\right)^T + h_{Ud}^{(i)}\log\left(h_{Ud}^{(i)}\right)^T - h_d^{*(i)}\log\left(h_{Ud}^{(j)}\right)^T - h_{Ud}^{(j)}\log\left(h_d^{*(i)}\right)^T\right],$$

where $$h_d^{*(i)}$$

is the i-th row of $$H_d^*, h_{Ud}^{(j)}$$

is the j-th row of $H_{Ud}$. A large DScore indicates a better quality for this measure. For the baseline method KIM and the proposed method TDF, the framework can directly make use of the CScore and DScore as these methods explicitly specify which topics are the common/distinct ones. For other baseline models, $k_c$ topic pairs were selected that have the smallest CScore and treat them as the common topic pairs and the rest as the discriminative ones to obtain CScore and DScore for comparisons.

Quantitative Results

FIGS. 4A-4C and 5A-5C present the results w.r.t. CScore, DScore, and RE (all in log scale) along the time:

The framework TDF can achieve the best balance regarding all three evaluation metrics. For example, when tested on Florence dataset, TDF can mostly get the smallest CScore and the largest DScore, meanwhile achieve as small reconstruction error as the standard NMF. Similar conclusion can be drawn for the Harvey dataset. This result manifests the advantages of incorporating the ONMF and the joint NMF modules.

KIM shows competitive CScore and DScore values as well. Nevertheless, its results fluctuate widely from time to time, especially for CScore. This is mainly because KIM performs joint NMF on the accumulated historical data that are noisy and complex whereas the proposed model uses the latent factor H as a concise summarization of the historical data. Hence, our model is not only more computationally efficient but also more optimization friendly.

KIM presents larger RE due to its joint matrix factorization of historical data and incoming data. Standard NMF can often obtain best RE because the goal of SNMF focuses on minimizing RE while other online topic models seek to balance between RE and computational efficiency. TDF presents very competitive RE because it separately conducts ONMF and matrix factorization on U.

In summary, TDF can effectively identify common and discriminate topics and also achieve almost least reconstruction error compared to baselines. The efficacy of leveraging ONMF and the joint NMF to explicitly model the commonness and distinctiveness, therefore, is corroborated.

Figures 6A, 6B:
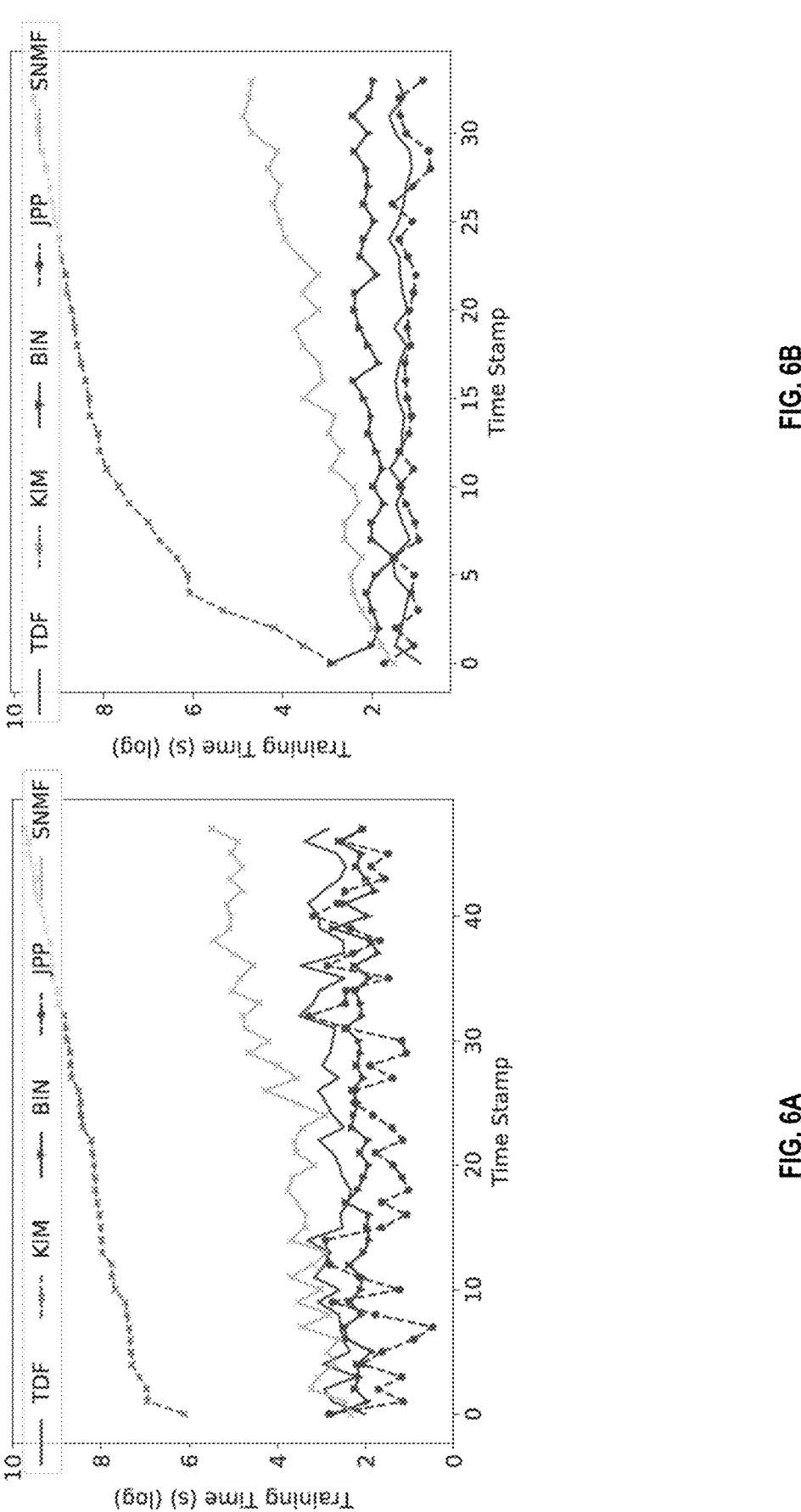
FIGS. 6A and 6B show comparisons of computing time for the Harvey and Florence datasets, respectively.

Computational Cost. We further show the comparisons of different models w.r.t. running time (in log scale) in FIGS. 6A and 6B. Among all the online methods (i.e., BIN, JPP, TDF), JPP often achieves the fastest update of latent factors for both Harvey and Florence datasets while BIN and TDF also show very competitive computational efficiency. Unsurprisingly, the computational cost of KIM and SNMF increases exponentially as more data arrives. This is because they have to conduct NMF on all the data received so far in order to update the latent factors. In addition, KIM simulfurther performed on the Harvey dataset. Table 2 shows the discovered common and distinct topics during the first five time periods during Hurricane Harvey. These topics are represented by the top ranked words returned by TDF—due to space constraints, only ten words are presented.

The common topics of tweets extracted before $t_1$ and new tweets posted at $t_2$ describe disaster-related themes such as the evacuation of residence, people praying for Texas, and family seeking assistance. Topics that are exclusive to t1 are relevant to Federal Emergency Management Agency (FEMA) spreading information on Twitter to provide help. Tweets arriving at $t_2$ reveals the gas shortage in Texas after Hurricane Harvey.

By comparing the topics extracted before $t_2$ and those emerged at $t_3$, we can observe that gas shortage and donation are the popular topics over these two periods. Meanwhile, at $t_3$, new topics about Katy ISD schools and Red Cross started emerging. According to the investigation of the original tweets in the data and information from the Internet, we found that the Katy ISD schools suffered flood damage since Harvey's heavy rains began pounding in Katy. Another unique topic at $t_3$ is Texas officials and residents discussed that the Red Cross floundered and failed to provide help.

One common topic over $t_3$ and $t_4$ is that the storm had started threatening children's safety. The exclusive topics at $t_3$ include Harvey destroyed the building of television station KHOU 11 and an anecdote about the Houston megachurch leader Joel Osteen, who refused to open the church for victims. Arising new topics at $t_4$ are relevant to the disaster situations of neighboring cities such as Dallas.

Animal rescue in Beaumont started receiving attentions over $t_4$ and $t_5$. The exclusive topics at $t_4$ include the actor Jake Paul helping rescue victims and the shut-off of shipments of unbranded petroleum due to gas shortage. At $t_5$, several new topics emerged such as Walmart donated to Hurricane Harvey Relief and Houston's historically black neighborhoods devastated by flooding.

TABLE 2

Visualization of the common and distinct topics during the first five time periods of Hurricane Harvey. $CT_{ij}$ denotes topics that are common before t, and at $t_j$, and $DT_{i(j)}$ denotes topics generated before $t_i$, that are distinct from topics at $t_j$

| $t_1$-$t_2$ | | | $t_2$-$t_3$ | | | $t_3$-$t_4$ | | | $t_4$-$t_5$ | | |
|---|---|---|---|---|---|---|---|---|---|---|---|
| $CT_{12}$ | $DT_{1(2)}$ | $DT_{2(1)}$ | $CT_{23}$ | $DT_{2(3)}$ | $DT_{3(2)}$ | $CT_{34}$ | $DT_{3(4)}$ | $DT_{4(3)}$ | $CT_{45}$ | $DT_{4(5)}$ | $DT_{3(4)}$ |
| texas | fema | gas | gas | fema | school | safety | khoull | neighbor | shelter | jake | walmart |
| evacuate | aid | shortage | fuel | figure | reopen | young | build | dallas | need | paul | donate |
| recover | fight | rare | singer | fight | katystrong | child | destroy | louisiana | info | peace | million |
| pray | file | fuel | donate | female | katyisd | tragedy | joel | forecast | rescue | rescue | neighbor |
| family | claim | crazy | party | fellow | flounder | devastate | osteen | east | million | negative | black |
| flood | texan | station | love | feed | cross | help | meme | hurricane | animal | image | history |
| help | help | crisis | heart | feel | red | rescue | funny | leeward | pet | gas | devastate |
| quick | navy | announce | shelter | fee | participate | family | response | island | beaumont | shipment | flood | taneously optimizes two regularization terms to model the commonness and distinctiveness of topics, significantly slowing down the computing speed. In contrast, our model is online and does not need to factorize the historical data. Hence, it is much more efficient than KIM.

Qualitative Studies

To better understand the usage of discovered common and distinct topics over time, in-depth qualitative analyses was In general, it was observed that common topics are often identified as being of interest to the public whereas distinct topics are often new alerting topics that are exclusive to a specific organization/individual during a certain time period.

Parameter Analysis

Figures 7A, 7B, 7C:
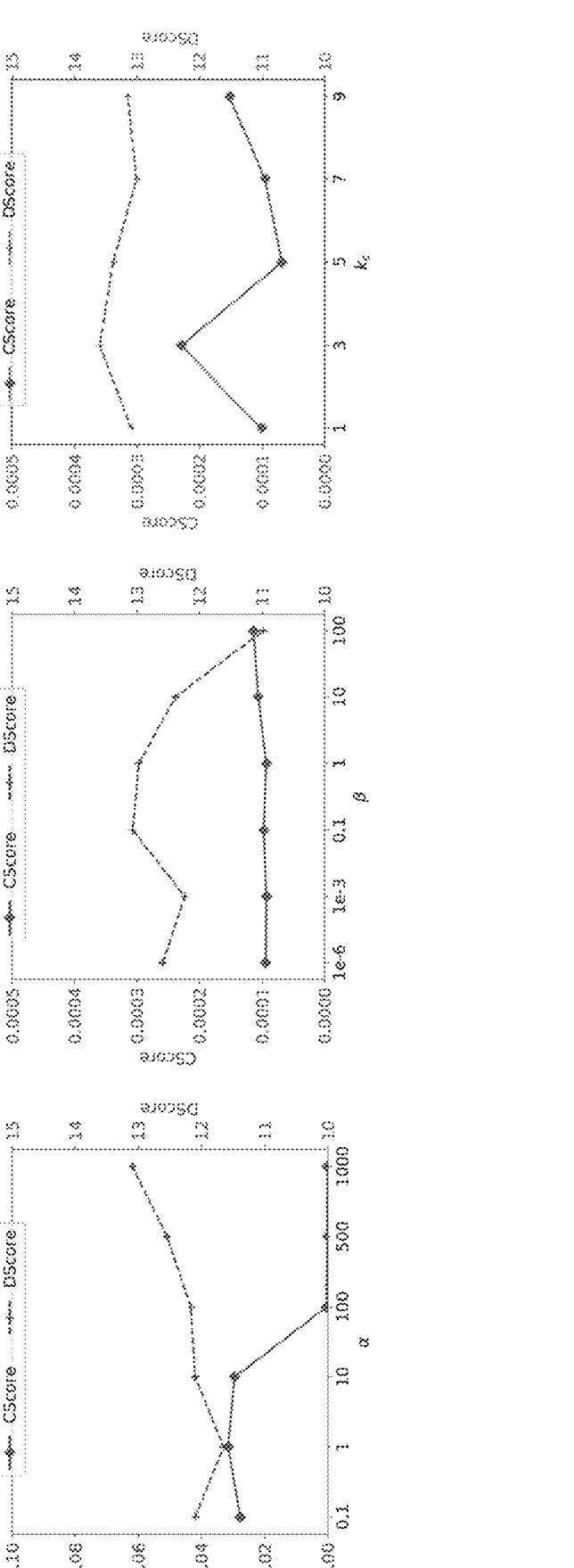
FIGS. 7A-7C show graphical representations of parameter studies of $\alpha$, $\beta$, and $K_c$.

Here, how the variation of $\alpha$, $\beta$, $k_c$ affects CScore (smaller the better) and DScore (larger the better) using the Harvey dataset were studied. In the experiment, $\alpha$ and $\beta$ are set among {0.1, 1, 10, 100, 500, 1000} and {1e–6, 1e–3, 0.1, 1, 10, 100}, respectively. $k_c$ is selected from {1, 3, 5, 7, 9} (the total number of topics is set to be 10). One parameter was varied at a time and fix the rest. For each set of parameters, the corresponding results were averaged along the time and present the mean of CScore and DScore in FIGS. 7A-7C. It was observed that larger a results in both better CScore and DScore. As a increases, TDF enforces the similarities between more common topics, making the rest topics more distinct from each other. For β, as it becomes extremely large, it shows significantly negative influence on the DScore. It was conjecture that overemphasizing the sparsity of the inner products of two matrices may not enforce the differences between these matrices as desired. The best performance is achieved when a lies between [500,1000] and β is between [0.1,1]. It was also observed from FIGS. 7A-7C that DScore is more robust to $k_c$ than CScore. All the quantitative results are computed with $k_c=7$, $\alpha=1000$, $\beta=0.1$.

Computing System

Figure 8:
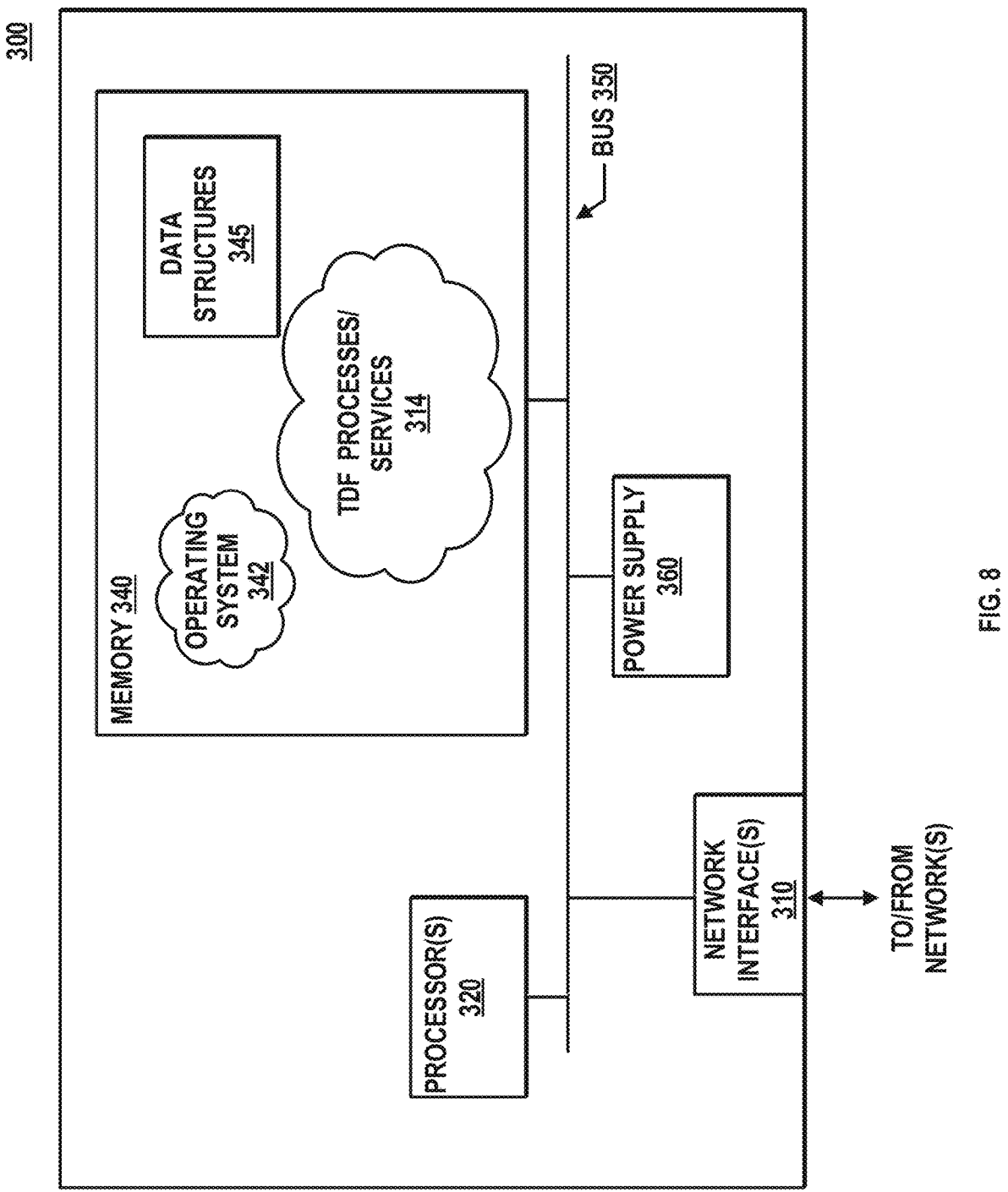
FIG. 8 is an illustration showing an exemplary computer system for executing the functionalities of the framework.

FIG. 8 is a schematic block diagram of an example device 300 that may be used with one or more embodiments described herein, e.g., as a component of system 100.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include TDF processes/services 314 described herein. Note that while TDF processes/services 314 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein.

Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the TDF processes/services 314 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a processor in communication with a memory, the memory including instructions, which, when executed, cause the processor to:

access historical social streaming data associated with first timesteps;

conduct matrix factorization of the social streaming data to derive a base matrix defining a summarization output including a latent factor embedded in a vector space within the first timesteps, the latent factor encoding discovered topics from the historical social streaming data;

access incoming social streaming data associated with second timesteps;

conduct matrix factorization of the incoming social streaming data to derive an incoming matrix from the incoming social streaming data;

apply a linear transformation on the base matrix to obtain a transformation matrix defining a transformed summarization output, such that in a new transformed feature space of the transformed summarization output common and distinct topics of the historical social streaming data can be found along with common and distinct topics of the incoming social streaming data, wherein the transformation matrix accommodates dynamic adjustment of dependency between the historical social streaming data and the incoming social streaming data, accommodates minimization of distances between common topic representations in the historical social streaming data and the incoming social streaming data, and accommodates maximization of distances and minimization of similarity between distinct topic representations in historical social streaming data and the incoming social streaming data;

project the summarization output associated with the historical social streaming data into the transformed feature space to adaptively align topic relationships between historical and incoming social streaming data using a joint non-negative matrix factorization process, wherein matrices corresponding to the historical and incoming social streaming data are concatenated to form a unified input for the joint non-negative matrix factorization; and output common and different topics between the first timesteps and the second timesteps associated with the historical social streaming data and the incoming social streaming data leveraging the transformed feature space that accommodates comparison between topics that are more similar and distinctiveness between topics that are more likely to be different between the incoming matrix associated with the incoming social streaming data and the transformation matrix associated with the historical social streaming data.

2. The system of claim 1, wherein the memory further includes instructions, which, when executed, further cause the processor to:
apply a nonnegative matrix factorization technique to the historical social streaming data, the first social streaming data defining a historic data matrix that encodes a word distribution in each topic of the plurality of topics indicated within the historic data matrix.

3. The system of claim 1, wherein the memory further includes instructions, which, when executed, further cause the processor to:
iteratively apply a joint nonnegative matrix factorization technique to an incoming data matrix indicative of the set of incoming social streaming data; and
identify a plurality of common topics of the plurality of topics that are shared between the incoming data matrix and a historic data matrix indicative of the set of historical social streaming data.

4. The system of claim 3, wherein the memory further includes instructions, which, when executed, further cause the processor to:
jointly update a summarization output and a coefficient matrix for a current time step, the summarization output encoding a word distribution in each topic found within the incoming data matrix, and the coefficient matrix capturing a correlation between a factorized incoming topic matrix indicative of a plurality of topics within the incoming data matrix using a summarization output from a previous timestep.

5. The system of claim 4, wherein the memory further includes instructions, which, when executed, further cause the processor to:
project the summarization output from the previous timestep into a new feature space to adaptively adjust a dynamic correlation between the summarization output from the previous timestep and the set of incoming social streaming data and yield a transformed summarization output.

6. The system of claim 5, wherein the memory further includes instructions, which, when executed, further cause the processor to:
minimize a norm between the transformed summarization output and a matrix product of a transformation matrix with the factorized incoming topic matrix.

7. The system of claim 4, wherein the memory further includes instructions, which, when executed, further cause the processor to:
minimize a reconstruction error on the set of incoming social streaming data by minimizing a difference between the incoming data matrix and a reconstructed common topic matrix and a reconstructed distinct topic matrix.

8. The system of claim 4, wherein the memory further includes instructions, which, when executed, further cause the processor to:
minimize respective distances between a plurality of common topics in the transformed summarization output and the factorized incoming topic matrix.

9. The system of claim 4, wherein the memory further includes instructions, which, when executed, further cause the processor to:
minimize respective similarities between a plurality of distinct topics in the transformed summarization output and the factorized incoming topic matrix.

10. A system, comprising:
a processor in communication with a memory, the memory including
instructions, which, when executed, cause the processor to:
obtain a base matrix defining a summarization output indicative of a set of historical social streaming data, the summarization output including a plurality of topics embedded within the set of historical social streaming data;
access incoming social streaming data;
apply a linear transformation on the base matrix to obtain a transformation matrix defining a transformed summarization output, such that in a new transformed feature space of the transformed summarization output common and distinct topics of the historical social streaming data can be found along with common and distinct topics of incoming social streaming data, wherein the transformation matrix accommodates dynamic adjustment of dependency between the historical social streaming data and the incoming social streaming data, accommodates minimization of distances between common topic representations in the historical social streaming data and the incoming social streaming data, and accommodates maximization of distances and minimization of similarity between distinct topic representations in historical social streaming data and the incoming social streaming data;
generate a transformation matrix defining a transformed summarization output, thereby accommodating, via a new transformed feature space, to adaptively adjust a dynamic correlation between the summarization output from a previous timestep and a set of incoming social streaming data;
project the summarization output associated with the historical social streaming data into the transformed feature space to adaptively align topic relationships between historical and incoming social streaming data using a joint non-negative matrix factorization process; and
update, at a timestep of a plurality of timesteps, a listing of common topics and a listing of distinct topics within incoming social streaming data using the transformed summarization output.

11. The system of claim 10, wherein the memory further includes instructions, which, when executed, further cause the processor to:
iteratively apply, at a timestep of the plurality of timesteps, a joint nonnegative matrix factorization technique to an incoming data matrix indicative of the set of incoming social streaming data; and
identify a plurality of common topics of the plurality of topics that are shared between the incoming data matrix and a historic data matrix indicative of the set of historical social streaming data.

12. A method, comprising:
obtaining, by a first computer-implemented nonnegative matrix factorization module, a base matrix defining a summarization output indicative of a set of historical social streaming data, the summarization output including a plurality of topics embedded within the set of historical social streaming data;

access incoming social streaming data;

applying a linear transformation on the base matrix to obtain a transformation matrix defining a transformed summarization output, such that in a new transformed feature space of the transformed summarization output common and distinct topics of the historical social streaming data can be found along with common and distinct topics of the incoming social streaming data, wherein the transformation matrix accommodates dynamic adjustment of dependency between the historical social streaming data and the incoming social streaming data, accommodates minimization of distances between common topic representations in the historical social streaming data and the incoming social streaming data, and accommodates maximization of distances and minimization of similarity between distinct topic representations in historical social streaming data and the incoming social streaming data;

generating a transformation matrix defining a transformed summarization output, thereby accommodating, via a new transformed feature space dynamic adjustment of dependency between the historical social streaming data and incoming social streaming data;

project the summarization output associated with the historical social streaming data into the transformed feature space to adaptively align topic relationships between historical and incoming social streaming data using a joint non-negative matrix factorization process; and updating, at a timestep of a plurality of timesteps and by a second computer-implemented nonnegative matrix factorization module, a listing of common topics and a listing of distinct topics within the incoming social streaming data using the transformed summarization output.

13. The method of claim 12, further comprising:

applying a nonnegative matrix factorization technique to a historic data matrix indicative of the set of historical social streaming data that encodes a word distribution in each topic of the plurality of topics indicated within the historic data matrix.

14. The method of claim 12, further comprising:

iteratively applying, at a timestep of the plurality of timesteps, a joint nonnegative matrix factorization technique to an incoming data matrix indicative of the set of incoming social streaming data; and identifying a plurality of common topics of the plurality of topics that are shared between the incoming data matrix and a historic data matrix indicative of the set of historical social streaming data.

15. The method of claim 14, further comprising:

jointly updating a summarization output and a coefficient matrix for a current time step, the summarization output encoding a word distribution in each topic found within the incoming data matrix, and the coefficient matrix capturing a correlation between a factorized incoming topic matrix indicative of a plurality of topics within the incoming data matrix using a summarization output from a previous timestep.

16. The method of claim 15, further comprising:

projecting the summarization output from the previous timestep into a new feature space to adaptively adjust a dynamic correlation between the summarization output from the previous timestep and the set of incoming social streaming data and yield a transformed summarization output.

17. The method of claim 16, further comprising:

minimizing a norm between the transformed summarization output and a matrix product of a transformation matrix with the factorized incoming topic matrix.

18. The method of claim 15, further comprising:

minimizing a reconstruction error on the set of incoming social streaming data by minimizing a difference between the incoming data matrix and a reconstructed common topic matrix and a reconstructed distinct topic matrix.

19. The method of claim 15, further comprising:

minimizing respective distances between a plurality of common topics in the transformed summarization output and the factorized incoming topic matrix.

20. The method of claim 15, further comprising:

minimize respective similarities between a plurality of distinct topics in the transformed summarization output and the factorized incoming topic matrix.

* * * * *